United States Patent [19]
Frye

[11] Patent Number: 5,376,171
[45] Date of Patent: Dec. 27, 1994

[54] SMALL PARTICLE SIZE LIGHTWEIGHT AGGREGATE

[76] Inventor: James A. Frye, 2107 Avenida De Las Alturas, Santa Fe, N. Mex. 87501

[21] Appl. No.: 229,164

[22] Filed: Apr. 18, 1994

Related U.S. Application Data

[60] Continuation of Ser. No. 964,009, Oct. 20, 1992, abandoned, Division of Ser. No. 688,822, Apr. 22, 1991, Pat. No. 5,169,307.

[51] Int. Cl.$^5$ .............................................. C04B 14/04
[52] U.S. Cl. ..................... 106/486; 106/484; 106/485; 428/404; 588/253
[58] Field of Search ............... 106/484, 485, 486, 697, 106/811; 501/80; 428/404; 405/528; 588/253

[56] References Cited

U.S. PATENT DOCUMENTS

| | | | |
|---|---|---|---|
| 2,471,769 | 5/1949 | Nanna | 366/155 |
| 3,131,919 | 5/1964 | Hartley | 432/131 |
| 3,244,408 | 4/1966 | Brownlie | 366/326 |
| 3,807,702 | 4/1974 | Grillo | 366/327 |
| 4,207,061 | 6/1980 | Ikenaga | 432/139 |
| 4,606,647 | 8/1986 | Frye | 366/331 |
| 4,657,810 | 4/1987 | Douden | 428/313.9 |
| 4,744,831 | 5/1988 | Beck | 106/288 B |
| 4,873,207 | 10/1989 | Keller, Jr. | 501/80 |

Primary Examiner—Karl Group
Assistant Examiner—Chris Gallo
Attorney, Agent, or Firm—Dougherty, Hessin, Beavers & Gilbert

[57] ABSTRACT

A process for producing micropellets of lightweight aggregate having a substantially spheroidal configuration which includes continuously mixing ceramic clay and liquid in a high speed rotating pin mixer to encapsulate substantially all other non-volatile inorganic solid materials present in micropellets having a diameter not exceeding about six mesh. The spheroidal micropellets are then fired at a temperature of at least 2,000° F. to oxidize all volatile organic compounds present. The light-weight aggregate of micropellets can advantageously-be used to replace sand in a cement or concrete matrix, as a well as for numerous other uses.

2 Claims, 4 Drawing Sheets

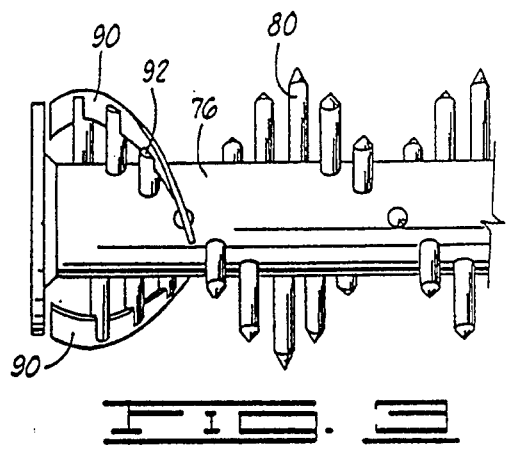
FIG. 3
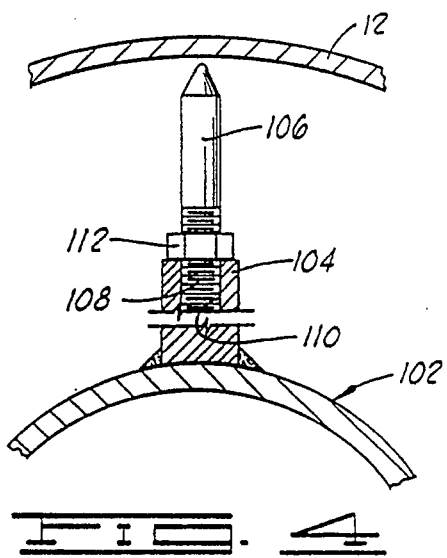
FIG. 4
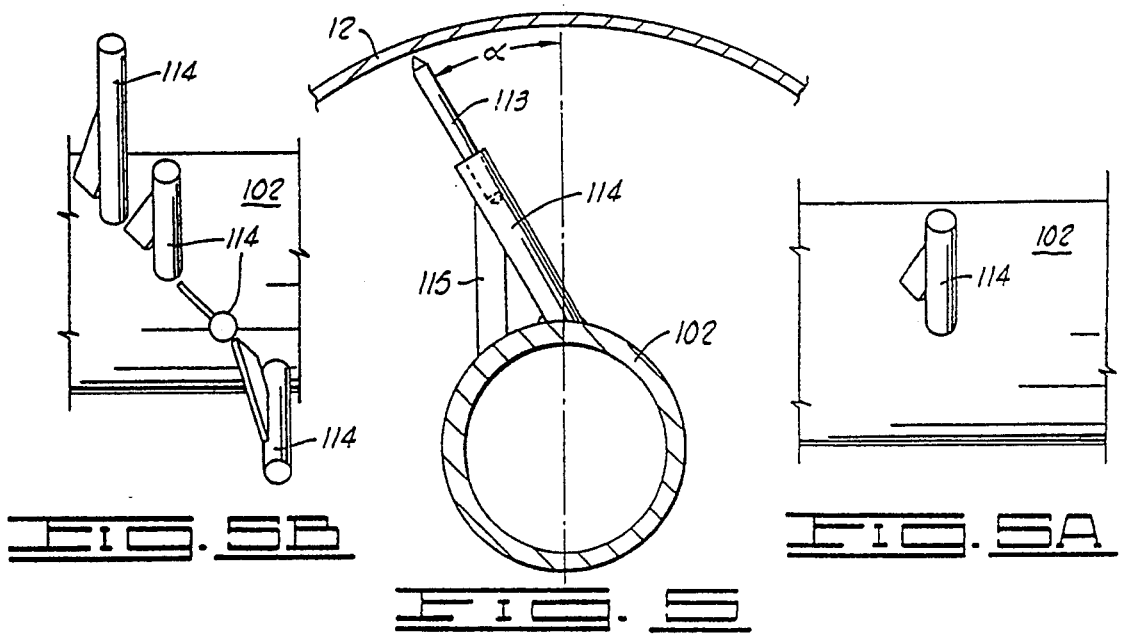
FIG. 5B
FIG. 5
FIG. 5A

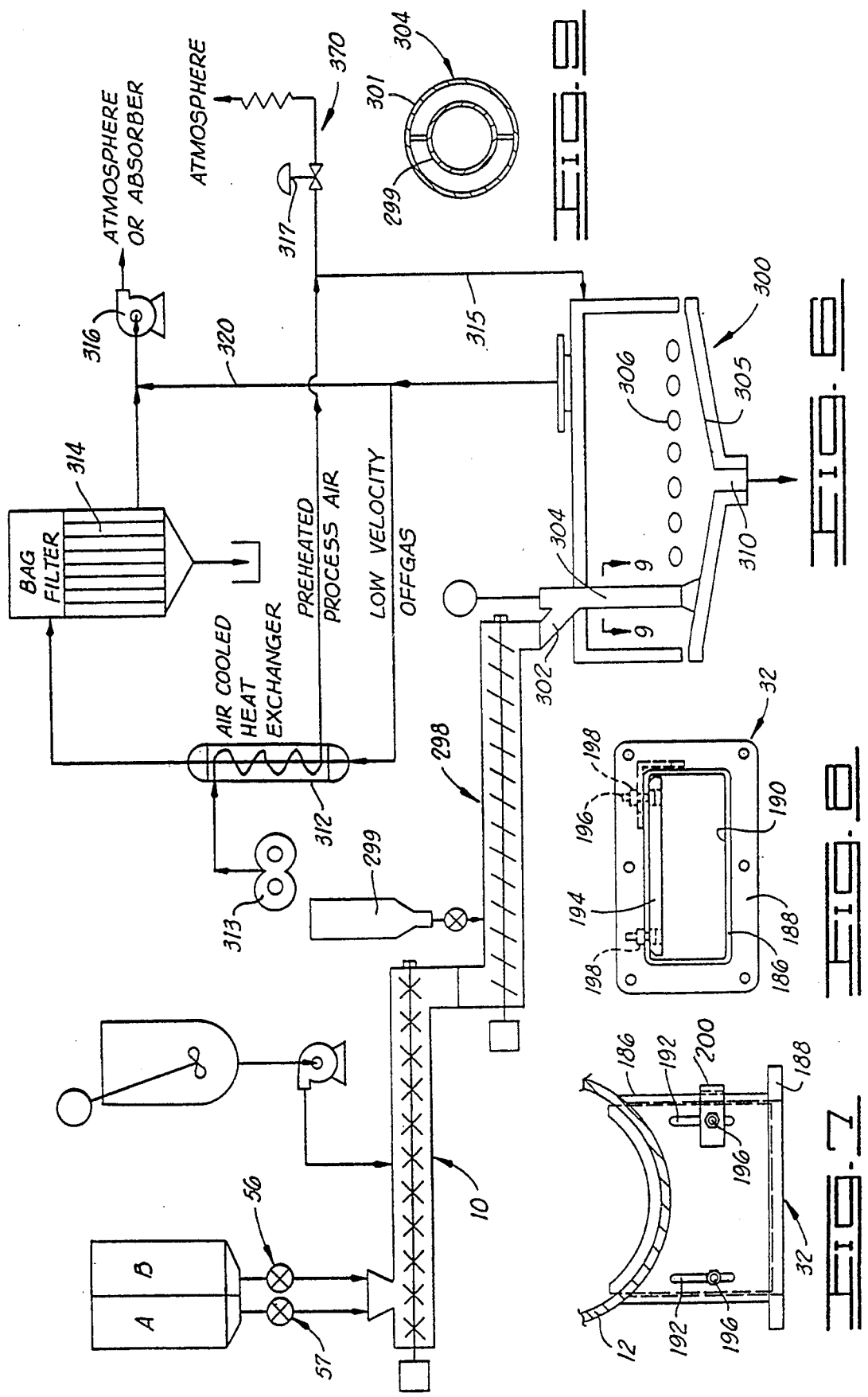

SMALL PARTICLE SIZE LIGHTWEIGHT AGGREGATE

This is a continuation of copending application(s) Ser. No. 07/964,009, now abandoned, filed on Oct. 20, 1992, which was a divisional of Ser. No. 07/688,822 filed on Apr. 22, 1991, now U.S. Pat. No. 5,169,307.

FIELD OF THE INVENTION

This invention relates to a method and apparatus for producing small, lightweight, high strength, spheroidal, hollow pellets having properties such that the pellets can be used advantageously in place of sand in a cement or concrete matrix, or can be used as a non-hazardous landfill cover.

BACKGROUND OF THE INVENTION

Brief Description of the Prior Art

It is known to produce gravel-size ceramic clay aggregate which is relatively light in weight. Such aggregate can be used in cement and concrete matrices materials used in construction. Several procedures are known for making such lightweight aggregate. One of the most effective processes for making a gravel-size lightweight aggregate of sufficient strength to resist fracturing, and usable in building materials, entails the initial step of mixing a relatively fine particulate ceramic clay with water in a batch blender apparatus, such as a pug mill. The water to clay ratio is adjusted to assure that a proper consistency similar to that of modeling clay is attained. Such consistency assures that the mixture will be susceptible to extrusion and particle formation in the subsequent steps of the process. Consistency determination may be effected by manual sampling, or by means of expensive moisture analyzers which continuously or periodically monitor the mixture to determine the moisture content, and, from this, the consistency of the mixture.

The mixture is discharged from the mixing zone into the hopper of an extrusion apparatus. The extruder is then used to force the clay composition through a series of small holes or orifices to form a series of long spaghetti-like rods. An automated chopping device periodically severes these rods at the forming orifices so as to form a quantity of small, relatively short cylinders having a length/width ratio of from about 1.0:1.0 to about 1.5:1.0.

The cylindrical particles thus formed are fed into a rotary drum dryer where the particles are dehydrated and rolled around the periphery of the drum to shape them into rough spheroids. The still damp spheroidal particles are discharged from the rotary drum dryer into the inlet of a rotary drum or a refractory lined kiln. Here they are fired for a period of about thirty minutes while they continue to roll against the inside surface of the rotating rotary drum kiln to complete the spheroidizing action. The pellets thus produced are from a size of about three-sixteenths inch to about one-quarter inch diameter with a hard outer shell, and a hollow to crusty interior caused by the expansion of trapped air and gas inside the "green" or damp pellets during the heating cycle. These pellets, when substituted for gravel in a concrete casting, provide a structure which is as strong as that containing the gravel for which they are substituted, and they can be used in place of the gravel at concentrations of up to fifty weight percent of the concrete composition. The lightweight of these particles enables a significant weight savings to be realized which reduces the transportation and handling cost in the building of precast concrete structures. Moreover, the void air spaces inside the lightweight aggregate particles provide concrete walls with greatly improved thermal insulating qualities.

Efforts to reduce the diametric size of the pellets have not been successful. The extrusion of the ceramic clay on a production basis appears to be limited to the use of extrusion ports having a diametric size of about one-eighth inch. Where attempts have been made to extrude the clay through smaller ports, the result has been plugging of the ports during the formation of the regular shaped pellets.

Attempts to produce smaller sized aggregate (than the gravel-size successfully used previously in cement and concrete matrices) by crushing and screening the expanded gravel-sized pellets have also not been successful. Breaking up the individual gravel-sized expanded pellets reduces the overall volume of the individual particles and increases the density by minimizing the effects of the internal cavities formed in the gravel-sized pellets by gas expansion. Moreover, undertakings to achieve size reduction by crushing and screening entails the use of expensive machinery, along with the necessary addition of other adjuncts to the material-handling system, which makes this type of operation economically prohibitive. Further, crushing and screening operations result in randomly produced oversized particles, along with very fine dust which is generated in the crusher, with a concomitant loss of from ten to fifteen percent of the total potential product through the scrapping of material that is outside of acceptable particle-size range.

BRIEF DESCRIPTION OF THE PRESENT INVENTION

Broadly described, the present invention provides a process for making lightweight micropellets of high strength suitable for use as a landfill cover, or as a lightweight replacement for sand in a cement or concrete matrix.

In the process, particles of ceramic clay are mixed in a pin mixer operated at a high rotational speed with a liquid material to form spheroidal micropellets having a mesh size of six or less, and preferably less than ten mesh. These are then fired at a temperature of at least 2,000° F. The resulting small, hollow, lightweight particles are useful as replacements for sand in building materials such as concrete or cement, or they can be used as a landfill cover. Many other uses will also be apparent to those skilled in the art when the physical properties of these tiny, particulate, chemically inert solid particles are considered.

In a particularly useful application of the invention, the ceramic clay is mixed with a solid or liquid waste material, or both, so that the spheroidal micropellets formed are chemically inert, lightweight materials, and the waste material has been beneficially or advantageously disposed of by blending and mixing with the clay so that a homogeneous mixture is formed with the waste material distributed throughout the micropellet. Close contact mixing in the pin mixer, plus firing in the kiln, accelerates a chemical reaction between the waste material and the clay so that heavy metals in the waste are converted to inert metal silicates.

The effectiveness of the process is due in large part to the agglomerating and shaping action brought to bear on the solid particulate ceramic clay and liquid feedstocks by a plurality of specially shaped and arrayed pins carried on the periphery of a rotating shaft in a pin mixer. These pins thoroughly mix and densify the liquid and clay, and yield structurally strong micropellets having a low water content, and therefore, susceptible to final firing in a suitable furnace without the necessity for further drying.

An important object of the present invention is to provide an apparatus which can be utilized to produce a very lightweight, very small micro-particle about the size of a particle of sand, yet much lighter than sand, and therefore, a beneficial replacement for sand in a concrete matrix in order to make a lightweight construction material.

Another object of the invention is to provide a process by which a ceramic clay material can be mixed with a solid or liquid waste material in a high speed pin mixer which effectively integrates the ceramic clay with the solid or liquid waste added to the pin mixer concurrently with the clay, so that the waste material becomes innocuous and chemically inert, and a useful product in the form of hollow micropellets is produced in the course of the process.

Additional objects and advantages of the invention will become apparent from the following detailed description of a preferred embodiment of the invention.

BRIEF DESCRIPTION OF THE DRAWINGS

FIG. 3 is a partial longitudinal elevational view of the pin mixer rotor showing the way that the pins are arrayed thereon.

FIG. 4 is a partial cross-sectional view showing a second embodiment of the rotor with the pins affixed thereon by a different means.

FIG. 5 is yet another embodiment of the rotor employing raked pins which are angled with respect to a diametric chord of the rotor for high speed, heavy duty operation in the process of mixing required when the pins of the rotor are under a high load.

FIG. 5A and 5B are detail structural drawings, in elevation, showing the manner in which the pins and gusset plates are mounted on the rotor in one embodiment of the invention.

FIG. 6 is a schematic illustration of a complete system utilized in carrying out certain applications of the process of the present invention, and showing therein, a rotary hearth kiln which can be used in the final step of the process of the invention for completing final drying and densification of spheroidal lightweight pellets made by the process of the invention.

FIG. 7 is a sectional view taken along line 7—7 of FIG. 1.

FIG. 8 is a sectional view taken along line 8—8 of FIG. 1.

FIG. 9 is a sectional view taken along line 9—9 of FIG. 6.

DETAILED DESCRIPTION OF A PREFERRED EMBODIMENT OF THE INVENTION

Figure 1:
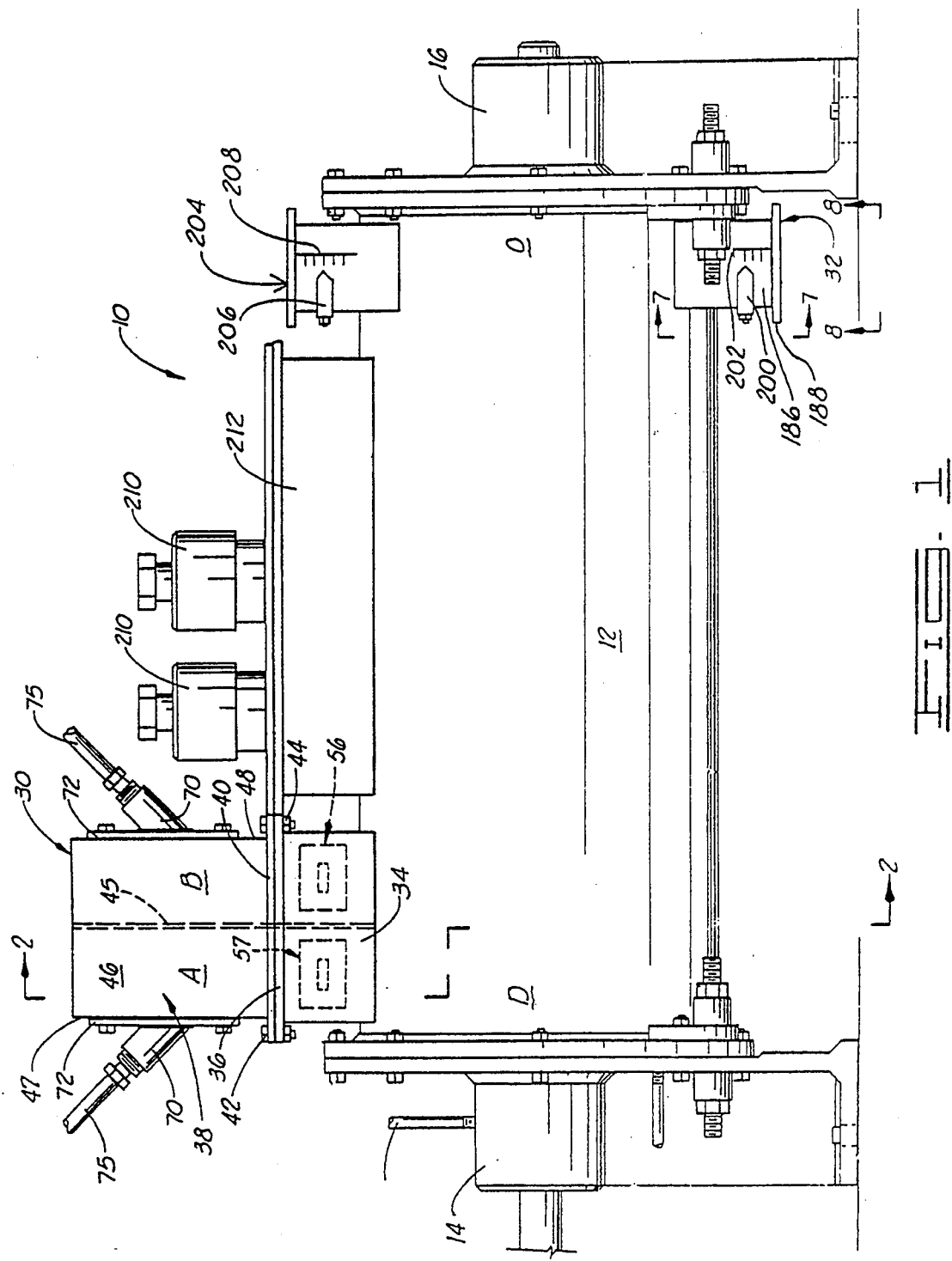
FIG. 1 is a side elevational view of a pin mixer forming a principle part of the apparatus and system used for performing and carrying out the process of the present invention.

Referring to the drawings, and particularly to FIG. 1, a pin mixer constructed for accomplishing the specialized pelletizing required in the present invention is designated generally by reference numeral 10. Certain structural aspects of a pin mixer of this general type are described in detail in my U.S. Pat. No. 4,606,647, and certain details of construction of such a pin mixer suitable for use in the invention are incorporated herein by reference from that patent. In general, the pin mixer is most suitably utilized in association with a rotary hearth kiln of the type illustrated in FIG. 6 of the drawings, and there denominated generally by reference numeral 300, and such associated usage of these general elements of the system will be hereinafter described in detail as the mixer and kiln are conjunctively used in carrying out the process of the invention. On some occasions, greater flexibility and versatility are obtained by including a second, different type of pin mixer 298 at a location between the first pin mixer 10 and the rotary furnace or hearth 300, as shown in FIG. 6. This arrangement facilitates more selective and flexible tailoring of the product micropellets produced in the process of the present invention.

The pin mixer illustrated in FIG. 1, and having some of its common parts described in greater detail in U.S. Pat. No. 4,606,647, includes an elongated substantially tubular shell 12 of generally cylindrical configuration, and having a drive end designated generally by the letter "D", and an outboard or discharge end designated generally by the reference letter "O". At the drive end "D" of the tubular shell 12, a bearing housing 14 is carried on the shell 12, and at the outboard end "O" of the tubular shell, an outboard end bearing housing 16 is located. Material to be subjected to the action of the pin mixer, in the manner hereinafter described, enters the shell 12 through an inlet subassembly designated generally by reference numeral 30, and is discharged by selectively controlled release through an outlet subassembly designated generally by reference numeral 32.

Figure 2:
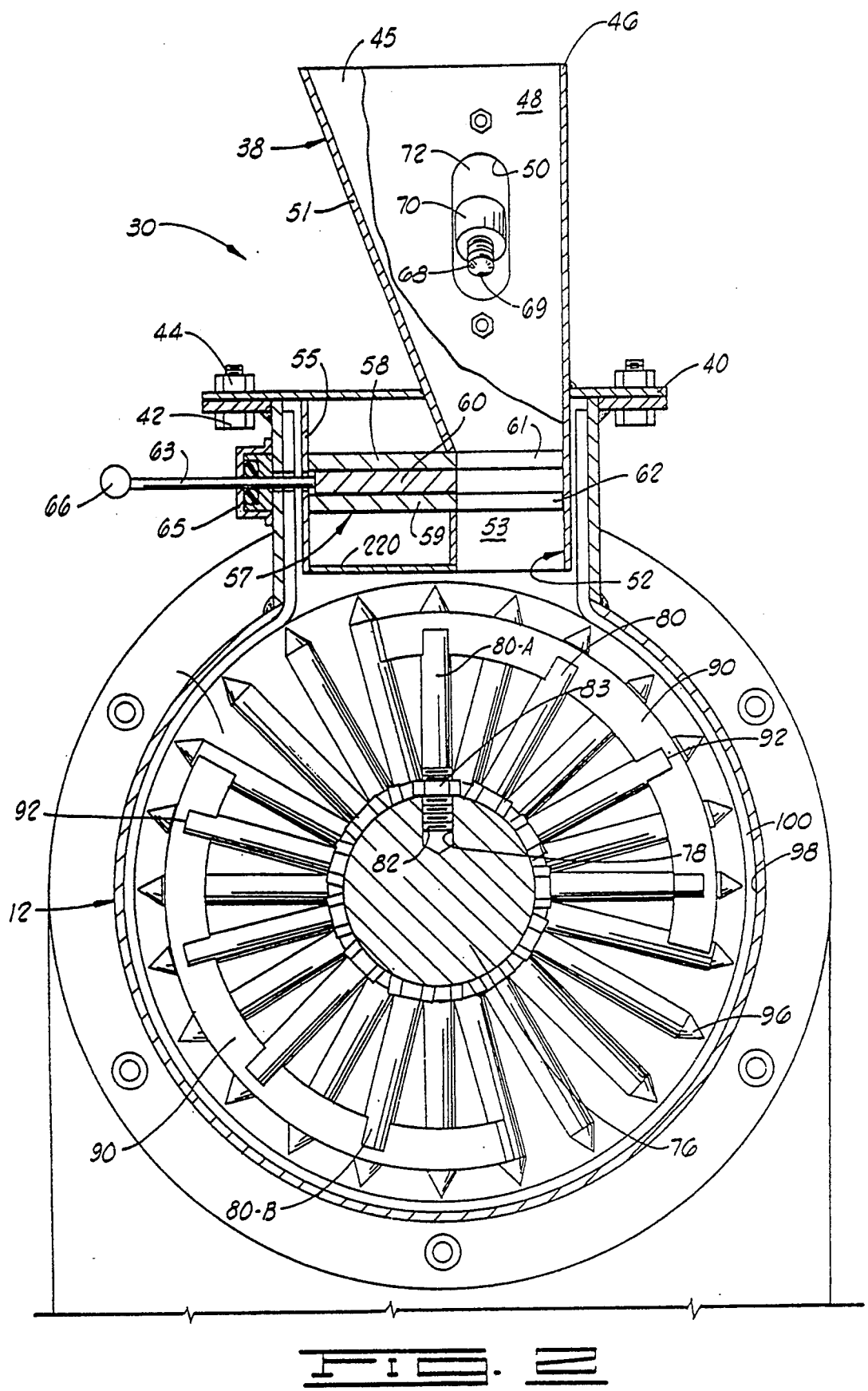
FIG. 2 is a cross-sectional view taken along line 2—2 of FIG. 1 showing details of the inlet subassemblies of the pin mixer apparatus, and a first embodiment of rotor used in the pin mixer apparatus.

The inlet 30 includes a neck 34 which extends radially outwardly from the shell at the upper side thereof. Its upper end terminates in an annular flange 36. The inlet 30 further includes a vertically partitioned inlet hopper 38 carrying a peripheral flange 40, as best illustrated in FIG. 2. This flange 40 is releasably secured to the flange 36 by suitable fasteners or bolts 42 and nuts 44.

The hopper 38 is divided into a pair of substantially identically shaped compartments, "A" and "B", by a transversely extending divider plate or partition 45 as shown in FIGS. 1 and 2. The hopper 38 has a first vertically extending side wall 46 and also includes a pair of opposed, parallel, vertically extending side walls 47 and 48. The vertically extending side walls 47 and 48 have openings 50, therethrough over which a pair of nozzle plates 72 are slidingly attached to facilitate vertical adjustment. At the opposite side of the two compartments "A" and "B" from the side wall 46 an inclined wall 51 is provided for closure of the respective compartments, and is inclined at an acute angle with respect to the vertical, as shown in FIG. 2.

It will be noted in referring to FIG. 2 that the hopper 38 has a relatively small neck 52 of rectangular cross-sectional configuration which projects down inside the radially outwardly extending neck 34 carried on the shell 12 near its inlet end "D". The neck 52 is divided by the partition plate 45 into two spouts 53 which provide outlets for compartments "A" and "B". Each of the spouts has an opening at the lower end thereof through which particulate material is discharged into the interior of the shell 12 as hereinafter described. An internal wall 55 is spaced horizontally from the neck 52 at the lower end of the hopper 38, and a deflector plate 220 is provided and functions to prevent solid particulate material from being thrown back out of the shell 12 during operation of the apparatus.

In order to permit the spouts from the respective compartments "A" and "B" to be selectively opened to a desired degree, two slide valve subassemblies 56 and 57 are provided. The slide valve subassembly 56 selectively opens the spouts 53 from the compartment "A", and the slide valve subassembly 57 functions to control the flow of solid particulate material from the compartment "B" through the second spout 53.

Each of the slide valve subassemblies 56 and 57 includes a pair of guide plates 58 and 59 which functions to receive and slidably guide a closure plate 60. Each closure plate 60 is movable independently of the other, and each reciprocates transversely across one of the spouts 53 associated with the respective compartment "A" or "B" which holds solid particulate material to be fed from the respective hopper compartments into the shell 12 of the pin mixer 10. Each closure plate 60 is further guided in its reciprocating movement by opposed tracks 61 and 62 located in the spouts of the respective compartments "A" or "B".

Each of the closure plates 60 has projecting therefrom, a cylindrical control rod 63 which extends through the outer wall 55 and through a dust seal 65 and carries at its outer end (outside the pin mixer shell), a manually operable control handle 66. As will be subsequently explained, each of the closure plates 60 can be projected a selectively variable distance into the respective spout 53 through which particulate material moves in leaving the compartments "A" or "B" to gravitate downwardly into the tubular shell 12 of the pin mixer 10.

A nozzle 68 having an aperture 69 therein is mounted in a nozzle housing 70, and one of these nozzle subassemblies, including the nozzle and nozzle housing, is attached to each one of two nozzle plates 72. Each nozzle plate 72 is slidingly attached to one or the other of the parallel, vertically extending side walls 47 or 48. As explained in U.S. Pat. No. 4,606,647, the nozzle 68 is axially adjustable and radially adjustable with respect to the shell 12. Suitable means can also be provided for introducing a fluid at a selectively variable pressure to each of the nozzles 68 via a suitable conduit 75.

Referring to FIGS. 2 and 3, one embodiment of rotor construction is illustrated. The rotor embodiment here shown includes a solid drum or shaft 76 of cylindrical configuration and having a plurality of internally threaded pin sockets 78 extending radially inwardly from the outer periphery of the rotor. A plurality of radially outwardly extending pins 80 of generally cylindrical configuration are mounted on the rotor by the extension of an externally threaded end portion 82 into threaded engagement with the internally threaded openings 78 in the rotor 76. The pins 80 may be conveniently secured in place by means of a lock nut 83 which jams against the outer periphery of the rotor drum 76.

As will be perceived in referring to FIGS. 2 and 3, the radially outwardly extending pins 80 are arrayed circumferentially around, and axially along, the rotor 76 to form a plurality of helices. In the preferred illustrated embodiment, two of such helices of pins are formed. As will be hereinafter described, where a second pin mixer is operated at a downstream, in series position with respect to one of the described two-helices mixers, the downstream mixer will frequently be constructed with but a single helix of pins. Referring again to FIG. 2, the first pin 80-A of one helix is angularly staggered with respect to the first pin 80-B of the second helix, so that the pins of the second helix are angularly displaced with respect to pins of the first helix.

It is preferred that the pins 80 on or within each of the two helices be substantially equally angularly spaced from each other so that each entire helix is angularly staggered with respect to the other of the helices. It is further preferred that the angular stagger, where two helices are provided, be 180°+one-half of the angular displacement of adjacent pins within a single helix. For example, but not by way of limitation, a twelve pin helix would have pins spaced at 30° intervals around the shaft. In this case, with two helices the angular adjustment of one helix with respect to the other is 195°. This relationship is illustrated by the pins 80-A and 80-B shown in FIG. 2. Thus, each of the pins of one helix is angularly displaced with respect to a diametric plane containing an adjacent pin in the other helix, rather than being aligned therewith. This preferred arrangement of the pins 80 carried on the rotor drum 76 is described in detail in U.S. Pat. No. 4,606,647.

The pins 80 function to thoroughly mix and to shape material placed within the shell 12 as the rotor, hereinafter further described, undergoes rotation. The helically arrayed pins 80 concurrently act as a screw conveyor or auger which moves the material from the inlet "D" toward the outlet "O".

As can be seen in FIGS. 2 and 3, a plurality of the pins 80 adjacent inlet 30 and in each of the pin helices are joined at the radially outer ends thereof by a solid ribbon plate 90 which extends radially from the outer ends of the pins. This ribbon plate 90 helps support pins 80, and has the further purpose of preventing blockage by particulate solid material as it enters shell 12 for mixing and transport. The radially outer ends of the several pins 80 which support the ribbon plate 90 have a flat outer surface 92 extending perpendicular to a radial axis thereof. The remainder of the pins 80 which are not connected by ribbon plate 90 have an outwardly pointing conical tip 96 adjacent an inner surface 98 of shell 12 in close, spaced relationship thereto. Inner surface 98 may be optionally coated with a rubber layer 100, or any other suitable material, as shown in FIG. 2. In the preferred embodiment of the pin mixer 10, the spacing between conical tips 96 and inner surface 98, or the inner surface of rubber layer 100, if such a layer is used, is approximately one-sixteenth to one-eighth inch.

The cylindrical rotor can be supported in the shell 12 for rotation by various means, but is preferably supported at the drive and inlet end "D" by a suitable stub shaft mounting arrangement of the type described in my U.S. Pat. No. 4,606,647, and there illustrated in FIGS. 5 and 6 of that patent. The construction of the outlet 32 of the pin mixer, and the structural details as to how the rotor is mounted within the shell 12 are also set forth in my U.S. Pat. No. 4,606,647, and will be later alluded to in this description.

Referring now to FIG. 4, a differently constructed rotor 102 used in a different embodiment of pin mixer which is especially useful in some types of methodology of the invention is illustrated. Rotor 102 is of hollow, substantially cylindrical configuration, and has a plurality of pin lugs 104 extending radially therefrom and fixedly attached thereto. Pins 106 each have an externally threaded end 108 which is engaged with an internally threaded opening 110 of each lug 104. Pins 106 are held in place by means of lock nut 112. Lugs 104 are angularly and axially spaced and helically arranged along rotor 102 in the same arrangement as are the pins 80 alluded to in describing the first embodiment rotor 76 illustrated in FIG. 3.

Yet a different pin mounting arrangement is illustrated in FIG. 5 of the drawings. The type of apparatus required for the practice of the present invention represents an advanced development of a pin mixer apparatus first utilized in the carbon black industry, and, in fact, in one embodiment of the invention includes, inter alia, an advance over, or improvement on, the pin mounting arrangement shown in my prior pin mixer patent (U.S. Pat. No. 4,606,647) which has been frequently mentioned in the present specification. In carbon black applications, the material being processed may vary in bulk density from about six to about twenty-five pounds per cubic foot, and the maximum motor size needed is generally about 30 horsepower.

By contrast, in process applications embodying the present invention and requiring the mixing and micropelletizing of ceramic clay, with or without various waste materials of relatively low moisture content, technically advanced pin mixer rotor designs are required, as well as a modified material feeding or inlet structure of the type illustrated in FIGS. 1 and 2. Conventional pin mixer rotor designs frequently include pins mounted to the solid drum of the rotor in the manner shown in FIGS. 1-3. This pin structure will provide excellent service in applications where small or medium sized units are employed at moderate speeds of rotation to process relatively light materials. Applications involving larger rotors operating at high speeds in order to process heavier materials, such as the ceramic clay used in the present invention, and which may have a density of as much as eighty to ninety pounds per cubic foot, often require a different and novel pin attachment design. Such design is shown in FIG. 5 of the drawings.

In order to give substantially greater strength and less dynamic loading to pins employed for achieving mixing of ceramic clay and similar heavier materials, the pinholder used in one embodiment of my prior pin mixers, and being of the type shown in FIG. 4, instead of projecting in a radial line from the periphery of the rotor as there shown, is canted at an angle to a projected diametric line of the rotor 102 extended through the base of the modified pin holder. This provides a more stream-lined air foil to contact the solid laden air stream confined in the space between the inner surface of the shell and the outer surface of the rotor. A raked or canted pin 113 threadly mounted in a correspondingly raked or canted pin holder 114 is shown in FIG. 5. An acute angle is defined by the canted pin 113 with a plane which includes the rotational axis of the rotor. This angle is designated as $\alpha$ and is schematically shown in FIG. 4. At various values of the angle $\alpha$, the resistance offered by each pin at various rotational speeds of the rotor can be calculated. The power input requirement for a particular type of particle laden air being processed in the pin mixer can thus be determined. Substantial reductions in individual pin loading and vibration can be realized by optimizing the magnitude of the angle $\alpha$.

Where a canted or raked pin arrangement is utilized, it is preferred to place a single gusset plate 115 on the back side of the pin holder, as shown in FIG. 5, in order to provide additional mechanical strength and reinforcement. The gusset plate 115, when used, is preferably oriented in a helical orientation on the shaft or rotor to assist in moving the particulate material through the pin mixer. By "helical orientation" it is meant that the gusset plate 115 lies in a plane which is intersected by the axis of rotation of the rotor at an acute angle (or by a plane extended normal to the axis of rotation). Stated differently, the base of the gusset plate follows the helical path of the pin array on the rotor. Such helical orientation of the gusset plate relative to the axis of the pin and pin holder is best illustrated in FIG. 5A and 5B of the drawings. The additional conveying action that this construction provides minimizes the potential for material plugging at the inlet which is common with conventional pin mixers.

Water or liquid chemicals or even a slurry for mixing with particulate solid material being agitated, rotated and advanced in the pin mixer can be injected into the shell 12 through liquid injector devices 210 which are mounted in an injector housing 212 attached to the shell 12. This liquid or slurry will be introduced into the shell 12 of the pin mixers about midway between the inlet "D" and the outlet "O".

Referring to FIGS. 1, 7 and 8, details of outlet 32 of the pin mixer shell 12 are shown. Outlet 32 has a neck portion 186 extending radially from shell 12 with an outwardly directed flange 188 at a lower end thereof. Neck 186 defines a central opening 190 therethrough and a pair of vertically disposed slots 192 through a wall thereof. A substantially vertically slidable baffle plate 194 is located in central opening 190 adjacent slots 192. A pair of studs 196 are attached to baffle plate 194 and extend outwardly through slots 192. Baffle plate 194 is held in place by a pair of nuts 198 threadingly engaged with studs 196. When nuts 198 are loosened, baffle plate 194 may be externally adjusted by using studs 196 as handles. An external pointer 200 attached to one of studs 196 is movable with baffle plate 194 and indicates the position of the baffle plate on a fixed scale 202 located on another surface of neck 186 as shown in FIG. 1.

A vent 204 is located substantially 180° from outlet 32 on shell 12 as shown in FIG. 1. Vent 204 has a similar baffle plate (not shown) with a pointer 206 indicating the baffle plate position on fixed scale 208.

Baffle plate 194 in outlet 32 and the baffle plate in vent 204 are each variably movable from a fully opened operating position to a fully closed position, and each baffle may be independently lowered or raised as desired. Flow of material in the apparatus can be stopped by moving the baffle plates toward rotor 74. This allows additional mixing of the materials in shell 12 prior to discharge. The manner in which extended mixing time is utilized in controllably enlarging the size of the pellets produced is hereinafter described.

Although it will be desirable in some instances to operate two or more of the pin mixers generally similar to one of the types shown in FIGS. 1-5 in a serial arrangement, as shown in FIG. 6, the operation of a single one of the pin mixers in carrying out the process of the invention will initially be described.

In one of the most straightforward and simple embodiments of the process of the invention, ceramic clay particles are fed into a single pin mixer via one of the compartments "A" or "B" within the inlet hopper 38. In this embodiment of the process of the invention, a type of clay preferably employed is a ceramic clay containing various percentages of silicon trioxide, aluminum oxide, iron oxide, titanium dioxide and some alkali metal compounds. The material may also include variable percentages of calcium oxide and magnesium oxide. The chemical composition of a particular clay is generally a function of the area from which the clay is excavated. The size of these charged clay particles can typically be from about 325 mesh to about 5 mesh.

It should be understood that from a process standpoint, a wide range of particle sizes of clay are acceptable, since the pin mixer is a fairly effective peripheral mill itself, i.e. if clay is introduced in commercial size granules or spherical beads of approximately 0.15 inches, the pin mixer will effectively reduce it to approximately 200 to 325 mesh powder before reforming it into micropellets. Extra power will be required to reduce the granules and retention time will increased thus cutting production rate by a slight amount. Optionally, if clay is received pre-milled into powder form, it is usually more expensive and is much more difficult to convey and meter accurately into the process. Required inlet particle size, therefore, is within practical limits, a decision that should be based on economics and operational efficiency as determined by material testing.

As soon as the solid particles of clay enter the annulus between the shell 12 and the rotor 76, the particles are impacted by the rapidly rotating pins 80 carried on the periphery of the rotor. The pins 80 extend substantially completely across the annular space between the rotor 76 and the shell as they rotate at high speed around the rotational axis of the rotor. The velocity of the tips of the pins will typically be from about 10 f.p.s. to about 75 f.p.s. The volumetric relationship of total pin volume to volume of the annulus between the rotor and shell is described in my U.S. Pat. No. 4,606,647.

As the particles of clay are impacted by the pins of the pin mixer, they are caused to move toward the downstream or discharge end of the pin mixer. In the course of moving axially in the direction of the discharge end of the pin mixer, the particles of clay pass through a wetting zone in the central portion of the shell. Here, a suitable liquid or semi-liquid is introduced to the interior of the pin mixer via the injector devices 210 carried on the injector housing 212. The particles of clay then begin to agglomerate and to be formed into micropellets of spheroidal configuration. The shaping of the micropellets into spherical configuration is an important aspect and advantage of this invention.

The micropellets continue on through the pin mixer until they reach the point of discharge therefrom through the opening 190. They are then charged to a suitable firing environment in which they are heated to a temperature in excess of about 2,000° F. A suitable micropellet firing apparatus can be a rotary hearth kiln 300 of the type shown schematically in FIG. 6 and hereinafter described in greater detail. Firing of the spheroidal micropellets causes them to harden and gain mechanical strength, and expands them so that they define a hollow interior space. The micropellets as thus manufactured are high strength, very small, hollow and therefore lightweight, particles.

In another embodiment of the process of the invention, particulate, finely divided solid clay material is fed into the pin mixer shell 12 through the inlet opening at the lower end of compartment "A" of the inlet hopper 38 as previously described. The average particle size of the clay particles fed to the pin mixer is preferably from about 325 mesh to about 20 mesh. Concurrently with the charging of the particles of ceramic clay to the interior of the shell 12 via the compartment "A" of the inlet hopper 38, a finely divided solid waste is preferably introduced to the pin mixer 10 from the compartment "B". By "waste" is meant an industrial or medical or agricultural discard material often of toxic or deleterious properties. It is highly desirable that such Waste be disposed of in a way which is environmentally acceptable, while concurrently making a valuable product, if such be possible.

In achieving this objective with the present invention, the waste material is metered into the pin mixer 10 by charging it through the compartment "B" of the inlet hopper 38 in a preselected proportion to the amount of ceramic clay which is charged from compartment "A". Within the shell 12, the proportional amounts of finely divided ceramic clay and particles of solid waste are intimately mixed with each other. At this time, all hoppers, chutes, cut-off valves and metering valves associated with the pin mixer are tightly and positively sealed to prevent emission of any dust particles from the pin mixer to the atmosphere. Suitable closures (not shown) are preferably provided over the top of compartments "A" and "B" to prevent dust emission.

In the upstream end of the shell 12, referred to for convenience as the first process zone, the two solid materials (clay and waste) fed to the interior of the shell from the hoppers "A" and "B" are intimately mixed and start to form mechanical and electrical bonds due to the static electricity generated during the high speed rotation of the rotor, and the impacting of the particles by the radially projecting pins 80. The helical disposition of the pins 80 on the rotor, coupled with the use of the previously referenced band or solid ribbon plate 90, cause the intimately mixed particles, which are now commencing to bond to each other, to be axially advanced in the direction of the downstream or discharge end "O" of the shell 12.

In the course of moving from the upstream end of the rotor to the downstream end under the action of the pins 80, the solid particles, now beginning to bond to each other, enter the central portion of the shell, conveniently and aptly termed the "wetting zone". In this wetting zone, the highly agitated particulate material is continuously sprayed with a small volume of selected liquid binder. This can be plant process water containing selected additives as may be required for specific material applications, or it can be a liquid or semi-liquid waste material as hereinafter described. The addition of this moisture increases the bonding action between the particles, and pelletization commences to occur.

Completion of pelletization occurs in the third process zone, which is yet further toward the downstream end of the rotor in the annular space between the rotor and the shell. The pin mixer may be further considered as having a fourth or densifying zone adjacent its discharge end. This zone provides the opportunity for the accomplishment of additional pellet growth and final densification, and a concomitant increase in the structural strength of the individual micropellets.

The micropellets thus formed are relatively dense, and are, relatively more spheroidal in shape than the types of pellets produced in any other pelletizing or agglomerating process previously used for the production of clay encapsulated micropellets. The micropellets produced by the process of this invention are smaller than about six mesh in size, and are preferably made smaller than ten mesh. The pellets discharged from the pin mixer are normally dry enough to eliminate the requirement for separate and additional dehydration, and this constitutes an important advantage of the present invention.

When the baffle plate 194 in outlet 32 and the baffle plate vent 204 are moved to their open positions, the micropellets can gravitate through the central opening 190 of outlet 32. Because the pins in the helices axially overlap, and because of the relatively high speed of the rotor, there is total mixing of the particulate material as it is moved axially through the shell 12 in the annular space between the rotor drum and the shell. It will sometimes be desirable to add selected property-imparting chemicals through the liquid injectors 210, in addition to those used primarily merely to achieve wetting and bonding.

The micropellets thus produced generally have the solid waste material encapsulated within the ceramic clay, and thus protected from contact with the ambient environment. The waste material and encapsulating ceramic clay microspheres are moved from the pin mixer to a suitable firing location, which can be a rotary hearth kiln (of the type schematically illustrated in FIG. 6), a fluidized bed or a conventional rotary drum kiln. At this location, all organic pollutants which may be present in the micropellets are oxidized as the micropellets are heated to a temperature exceeding about 2,000° F. Hot off-gas is treated by air pollution control equipment that has been established as industrially acceptable. A system of this sort is indicated generally and schematically in FIG. 6 of the drawings, and is there denominated by reference numeral 370. It is hereinafter described in greater detail.

It should be here pointed out that for some construction applications, a dense aggregate is desired that will give the concrete structure additional weight (e.g. concrete piers, shore line and underwater construction). In geographic areas where sand and gravel must be shipped to the construction site but where excavated clay represents a waste material to be hauled to disposal, the process of the invention provides a cost-effective alternative. Dense aggregate is produced by adjusting the furnace heat and retention time to drive off the air normally trapped in the center of the pellet.

An additional potential application for the denser micropellets is in the hydraulic fracturing of oil bearing formations to stimulate greater production. This technique requires a propping agent that flows into formation fissures created by hydraulic pressure induced by large pumps on the surface. The propping agent is usually pre-screened sand but such diverse materials as alumina and steel pellets, and even pre-milled and coated coconut hulls have been used. The purpose of the propping agent is to prevent the formation fissures from closing after the fracturing pressure is released and to provide flow passages for the oil as it migrates toward the well bore. The dense micropellets with their excellent structural qualities, chemical resistance and smooth surfaces for efficient pumping characteristics appear to be ideal for this purpose.

Specific examples of types of waste materials which can be advantageously pelletized in the process of the present invention are spent catalyst fines, pre-screened contaminated soil, incinerator ash, bag-filter dust, mill scale, dried filter cake, and dust and "fluff" from solid waste grinding, shredding and milling processes.

It has been determined that when the pellets are fired in the furnace or hearth in the last step of the process, heavy metals which may be concentrated in the solid waste material introduced to the pin mixer form strongly bound silicates with silicon derived from the silicon compounds in the ceramic clay. These inert metal silicates are identical to those found in natural ores and formations, and therefore the lightweight aggregate so produced is generally considered to be chemically inert and environmentally non-hazardous as a result of the strong bonding of the metalized ions in the silicate compounds thus formed.

The process of the invention also has particular utility and advantage for the processing of waste sludges, waste liquids, semi-solid wastes and slurries. In this use of the process, it is preferable that only the ceramic clay particles be admitted into the inlet 30 from the upstream end of the pin mixer 10. As an option, a dry particulate solid can also be metered into the pin mixer and premixed with the clay. The liquid fraction, however, constituting one of the described types of liquid waste, which may be in sludge, liquid, semi-solid or slurry form, is injected into the pin mixer through wetting zone nozzles 210 appropriately modified as needed to function effectively in injecting this often more viscous material into the shell 12 of the pin mixer 10. The liquid fraction of waste material is then combined with the ceramic clay in certain predetermined proportions. The mixture of viscous or liquid waste with the ceramic clay becomes micropelletized, and these pellets are then fired so that all volatile organic materials are oxidized in the rotary hearth kiln 300 or other firing apparatus.

In the event that the waste material is acidic in character, a caustic fraction (for example, calcium carbonate, sodium carbonate or sodium hydroxide) can be concurrently metered into the mixing zone to effectively neutralize the acid at the source of its subsequent release into the wetting zone of the pin mixer.

It is important to note that the micropellets when discharged from the pin mixer are, in most cases, dry enough to eliminate the requirement for a separate dehydration operation carried out upstream from, and in addition to, the firing of the pellets to achieve the final thermal expansion and densification In this regard, it should also be pointed out that in the process of the invention carried out using the described advanced pin mixer for forming highly condensed hollow micropellets, the moisture content required to form the micropellets is much lower than is required to produce clay in a sufficiently plastic state to permit it to be extruded and chopped, using the technology previously employed for making the substantially larger (gravel-sized) pellets which have been used in concrete and other building materials. Moreover, the low moisture content of the pin mixer-generated micropellets enable expensive and bulky rotary drum dryers to be eliminated. The requirement for less heating is further economically enhanced by the fact that the micropellets, being smaller in size, are characterized in the aggregate in having an expanded surface area, and this provides for much more efficient heat transfer as the pellets are fired in the final step of the process.

Further, the spherical shape of the pellets is achieved in a single pass through the pin mixer. It is therefore not necessary to achieve this spherical configuration by the use of a rotary drum dryer and a rotary drum kiln operated in series, and acting mechanically upon the irregularly shaped pellets entering these devices. The micropellets from the pin mixer can be economically and efficiently fired by various types of furnaces, as may be demanded by various specific process requirements. These types of furnaces include rotary drum, rotary hearth, fluidized bed or conveyor-type furnaces. As schematically illustrated in FIG. 6 of the drawings, and hereinafter described in greater detail, a rotary hearth kiln can be quite satisfactorily used for the firing step of the present invention.

While the principle advantages of the present invention are realized in the production of micropellets of spheroidal configuration and having a hollow core, or having solid waste material encapsulated in the interior of the hollow sphere, the pin mixer depicted in FIGS. 1–5 can also be very usefully employed and operated so that micropellets larger than about six mesh, or stated differently, larger than sand size, can be selectively produced. Occasionally such larger pellets are the product of choice. A clear advantage of the pin mixer of the present invention is its capability of producing either type of particles (large or small), while using the same production line and equipment.

Thus, to satisfactorily employ a relatively small diameter single pin mixer unit for making relatively larger micropellets of, say gravel size, the pin mixer unit is started up as if for normal small or micropellet production. The volume of liquid normally supplied from the nozzles 210 to the wetting zone within the shell 12 may be reduced, and the variable baffle plate 194 described in detail in U.S. Pat. No. 4,606,647 is closed to a point of minimal micropellet discharge so that, at least initially, only a very small proportion, or none, of the pellet product is discharged from the pin mixer. With the system in this status, the clay particles are continuously fed through the inlet opening into the shell 12 from compartment "A", and other dry particulate material is concurrently fed from compartment "B" at a slightly reduced rate. Some liquid binder material may be beneficially fed into the pin mixer through compartment A with the clay particles. It will usually be desirable to also reduce the angular velocity or rotational speed of the rotor 76 during the processing of some materials.

Further pellet enlargement occurs in the single pin mixer after the micropellets reach the discharge area within the shell. Here, in this large pellet mode of operation, they cannot be discharged, since the baffle plates are closed. Consequently, the micropellets start "backing up" toward the inlet of the pin mixer as they are forced in that direction by the action of the rotating pins. Apparently, the conveying action of the rotor with its peripheral pins causes congestion of pellets adjacent the closed discharge end of the shell. The micropellets in the pin mixer, however, are subjected to continuing agitation, and start to reverse direction within the shell, probably through random selection along the path of least resistance. As more and more of the micropellets find the discharge blocked, more and more of them grow in size and move toward the intake end of the shell.

Since the "senior" pellets have had a longer residence time within the pin mixer, they have had the opportunity to attract more and more clay particles, so that they have added, during that time, both mass and volume. These pellets apparently act as miniature "snow balls", and continue to become larger in direct proportion to their length of residence time, the extent of their collision with smaller particles, and the mechanical and electrical activity of the pellets while they are in the pin mixer. Since these pellets are heavier than the relatively newer pellets which have had a shorter residence time in the shell, centrifugal forces keep them spinning and rolling around the outer periphery of the material flow. As they approach the mixing and pelletizing zones, the larger pellets of longer residence time within the shell contact more and more soft formative, micropellets that are more easily absorbed and distributed over the large pellet's outer surface.

A periodic check on the pellet size and characteristics is made by slightly opening the bottom baffle plate 194 so as to discharge a sample of the pellets for size analysis. After removal of a sufficient quantity of gravel size pellets, it is then possible at the option of the operator to return to the original operating mode until small pellets start to appear, and then gradually return at the operator's option to large pellet production. The inherent recycling capability of the improved pin mixer effctly converts the normally continuous operation to a partial batch operation, thus allowing the pellets to grow in size as the dry solid particles contact the damp sand-sized micropellets, and are bonded to each growing spheroid in successive layers.

For some types of operations, tests of the produced pellets may indicate that the desired product characteristics are more nearly achieved when alternate pins are removed from the pin array on the rotor in the pellet densifying zone. This reduces the rate of flow of finished pellets toward the discharge end of the drum.

For the production of some types of micropellets, production lines including two, slightly differently constructed pin mixers operated in series, as shown in FIG. 6, are required. This, in effect, gives two pin mixer passes to each pellet as it moves through the processing phases. In FIG. 6, it will be perceived that the equipment which is employed includes the first or primary pin mixer 10, and a second pin mixer 298. Generally, the primary pin mixer 10 will have a larger diameter (about 10 percent larger) than the second pin mixer and their lengths will be essentially the same. The primary pin mixer 10 will be fitted with a double helix of pins, as previously described, to attain overlapping pin sweep paths, and theoretically subject all particles to contact. The second pass pin mixer 298 usually is fitted with but a single helix of pins so that gaps exist between adjacent sweep paths of the pins. This single helix array retards particle flow, and increases the rolling action of the pellets so that they are polished and work hardened. The symbol "X" is used for the double helix pin array in the primary pin mixer, and "/" is used to schematically indicate the single pin helix used in the second pin mixer 298.

The second pin mixer 298 has its inlet connected to the discharge end of the first pin mixer 10 so that finely divided material discharged through the opening 190 at the outlet 32 of the primary pin mixer passes through the variable orifice at a rate controlled by selective setting of the orifice plate 192, and move at this rate into the second pin mixer. The first pass through the primary pin mixer 10 is continued in the small micropellet production mode hereinbefore described. Thus, pellets, generally having a size of less than six mesh, and preferably less than ten mesh, are moved out of the first pin mixer into the second pin mixer.

In the second pin mixer 298, additional dry solid particulate material is metered from a chamber 299 into the annular space between the shell and the rotor at a location which is relatively near the upstream end of the pin mixer. This can also be accomplished by charging the additional material from one of the types of compartments "A" or "B" already described as being used in most pin mixer embodiments. The speed of the rotor in the second or downstream pin mixer 298 is decreased to retard the rate of flow of the pellets through the second pin mixer, and thus to facilitate accumulation of additional dry material onto the outer periphery of the damp micropellets. The pellets also will generally move slower through the second pin mixer by reason of the single helix, wider pin spacing (than in the case of the primary pin mixer). The rate of material flow into the second pin mixer from the first pin mixer, and the rotor speed in the second pin mixer 298, are adjusted until pellets of the desired size start appearing at the micropellet discharge port at the end of the second pin mixer. The process is then continued and pellets of the desired size continue to be discharged out of the downstream end of the second pin mixer.

The discharged pellets from the second pin mixer 298 pass into a branch or leg 302 of a water jacketed inlet chute 304 through which water is circulated in an annulus between an inner tube 299, through which micropellets gravitate, and an outer tube 301, as shown in FIG. 9. This allows the temperature of the pellets at this point to be maintained below 1,000° F. as they gravitate to the upper surface of the rotary table 305 of the rotary hearth kiln 300. The water circulated in the annulus of the water jacketed inlet chute 304 also functions to cool the pellets and to prevent them from sticking to the chute, and assures that they gravitate freely downwardly to the upper surface of the rotary table 305 of the rotating hearth kiln 300. The micropellets on the upper surface of the rotating table of the rotary hearth kiln 300 are carried beneath gas or electric infrared heating elements 306, and are thereby heated to cause the densification of the outer coating of ceramic clay, and an expulsion from the pellets of any small amounts of residual moisture.

The product pellets ultimately slide downwardly to the center of the rotating hearth, and are discharged through a central tubular spout or discharge pipe 310. The hot, dirty off-gases from the rotary hearth kiln 300 exit from the kiln and pass through the shell side of an indirect air-cooled heat exchanger 312. At the heat exchanger inlet, the temperature of the off-gas is approximately 1500° F. The cooling air in the heat exchanger 312 is provided by atmospheric air directed to the tubes of the heat exchanger by means of a positive medium pressure blower 313. In the heat exchanger, the cooling air is heated from ambient temperature of about 70° F. at standard conditions to approximately 700° F. to 850° F. by the hot kiln off-gas. This pre-heated air is then predominantly directed into the kiln burner manifold where it is used as combustion air. The excess air also provides oxygen that enhances the chemical reaction occurring within the clay particles in which the heavy metals are converted to inert silicates. The preheating of the combusted air by heat exchange in the heat exchanger 312 greatly improves the efficiency of the kiln and fuel consumption is drastically reduced. A control valve 317 directs air not required by the process to the atmosphere.

The hot off-gases from the kiln are cooled to a temperature of from about 400° F. to about 600° F. upon leaving the heat exchanger 312. Additional cooling as required in order to protect a fabric filter bag system 314 is provided by a modulating dilution air valve (not shown) in the duct work which conveys the off-gases to the bag filters. Such valve will open automatically at an excessively high temperature signal received from a sensor located at the bag filter inlet, and will allow cooler atmospheric air to flow through the off-gas stream, thus reducing its temperature to the 400° F. to 450° F. maximum required to protect the filter bags.

In the bag filter system 314, material particles floating in the off-gas stream are separated and are periodically collected in a suitable container illustrated schematically beneath the filter. An advantage of using the rotary hearth kiln to fire the particles is the extremely low off-gas velocity which results, and reduces the quantity of solid particles entrained in the off-gas stream. This consequently reduces the loading of the bag filter system 314.

An induced draft blower 316 pulls the vacuum on the bag filter system so that off-gas is directed through the heat exchanger 312 and the bag filters 314. The cleanoff gas is then directed by the induced draft blower to the atmosphere, or if the presence of hazardous material in the process train dictates, to a chemical absorber column.

An emergency duct 320 relieving excess rotary kiln off-gas pressure directly through the induced draft blower is illustrated in FIG. 6. Here again, a dilution valve for direct air cooling, as earlier described, will often be required. Moreover, in many instances, it will be a better arrangement to direct the hot kiln gases passed through the emergency duct to a stack for venting directly to the atmosphere, instead of through the blower 316 as illustrated in FIG. 6.

Other conventional air pollution control equipment can also be used to receive and process the hot off-gases from the rotary hearth kiln 300.

Although it has been indicated earlier in this application that small pellets having a diametric size of less than six mesh have more technological applications than the larger, gravel-sized micropellets, and are economically more valuable than the larger particles previously produced, the composite system illustrated in FIG. 6 has the capability of permitting the aggregate producer to manufacture both or either of the larger and smaller pellet sizes by changing operational parameters between production runs, and by closely and independently controling the mode of operation of each of the pin mixers 10 and 298. Moreover, in contrast to serial operation of the two pin mixers, either one can be operated independently of the other, if this should be desirable.

In yet another application of the process of the invention, a portable pin mixer can be mounted on suitable trailers and then re-assembled at a sight of contaminated soil. The soil is excavated, then coarse screened to remove large foreign objects such as tree limbs, roots and rocks and construction rubble. The relatively uniform contaminated soil is then fine screened to remove small stones and large sand particles. The oversized material is processed separately by chemical washing or other methods, as dictated by the results of preliminary testing of the soil. It may be determined by pretesting that screened and milled contaminated soil itself has a sufficiently high clay content that little or no additional clay will be required to achieve micropelletization by one pass at relatively high speed through the pin mixer, or by use of the automatic recycyling that will occur when the pin mixer is operated continuously over an extended period of time without removal of pellets therefrom. In such cases, the contaminated soil will be micropelletized and fired as in the other applications of the invention which have been described, except that uniform particle size and uniform structural integrity of the micropellets developed in this instance, will not, as in most cases, be required, since the micropellets produced during soil remediation will be used only to refill the excavations from which the soil has been taken initially.

Yet one other embodiment of the process of the invention appears to have great potential. This entails pre-mixing clay and sand in the pin mixer prior to firing in order to produce stabilized gravel on-site for temporary roads and vehicle areas. This application appears to have potential for oil well exploration and drilling operations in remote sandy areas, as well as for military purposes.

Although preferred embodiments of the invention have been herein described, various changes and innovations can be made in the structures which have been illustrated and described without departure from the basic principles of the invention. Changes of this type are deemed to be circumscribed by the spirit and scope of the invention, except as the same may be necessarily limited by the appended claims, or reasonable equivalents thereof.

What is claimed is:

1. A lightweight solid micropellet comprising:
    a hollow ceramic clay spheroidal particle having a diameter of less than six mesh; and
    a solid waste material encapsulated in the hollow ceramic clay spheroidal particle.
2. A lightweight solid micropellet as defined in claim 1 wherein said spheroidal particle has a diameter of less than ten mesh.

* * * * *